(12) United States Patent
Zhang

(10) Patent No.: US 10,401,947 B2
(45) Date of Patent: Sep. 3, 2019

(54) METHOD FOR SIMULATING AND CONTROLLING VIRTUAL SPHERE IN A MOBILE DEVICE

(71) Applicants: BEIJING JINGDONG SHANGKE INFORMATION TECHNOLOGY CO., LTD., Haidian District, Beijing (CN); BEIJING JINGDONG CENTURY TRADING CO., LTD., Beijing (CN)

(72) Inventor: Sicong Zhang, Beijing (CN)

(73) Assignees: BEIJING JINGDONG SHANGKE INFORMATION TECHNOLOGY CO., LTD., Beijing (CN); BEIJING JINGDONG CENTURY TRADING CO., LTD., Beijing (CN)

( * ) Notice: Subject to any disclaimer, the term of this patent is extended or adjusted under 35 U.S.C. 154(b) by 116 days.

(21) Appl. No.: 15/524,858

(22) PCT Filed: Nov. 3, 2015

(86) PCT No.: PCT/CN2015/093735
§ 371 (c)(1),
(2) Date: May 5, 2017

(87) PCT Pub. No.: WO2016/070800
PCT Pub. Date: May 12, 2016

(65) Prior Publication Data
US 2017/0315609 A1 Nov. 2, 2017

(30) Foreign Application Priority Data
Nov. 6, 2014 (CN) .......................... 2014 1 0619473

(51) Int. Cl.
*G06F 3/00* (2006.01)
*A63F 13/573* (2014.01)
(Continued)

(52) U.S. Cl.
CPC ............ *G06F 3/005* (2013.01); *A63F 13/213* (2014.09); *A63F 13/426* (2014.09);
(Continued)

(58) Field of Classification Search
None
See application file for complete search history.

(56) References Cited

U.S. PATENT DOCUMENTS

2008/0030499 A1* 2/2008 Wanda .................... G06F 3/011
345/419
2011/0254860 A1* 10/2011 Zontrop ................ G06T 19/006
345/633
(Continued)

FOREIGN PATENT DOCUMENTS

CN 101893935 A 11/2010
CN 102238987 A 11/2011
(Continued)

OTHER PUBLICATIONS

International Search Report and Written Opinion for Application No. PCT/CN2015/093735 dated Jan. 7, 2016 (9 pages).

*Primary Examiner* — Justin P. Misleh
(74) *Attorney, Agent, or Firm* — Michael Best & Friedrich LLP

(57) ABSTRACT

A virtual sphere simulation and control method for a mobile device. One method includes acquiring images using an image acquisition component of the mobile device, so as to acquire a sequence of continuous images; analyzing contents of the images; in the sequence of the acquired images, according to a certain rule, carrying out the interaction between a virtual sphere and the contents of the images as well as a user; and displaying a result of interaction on a screen of the mobile device.

4 Claims, 5 Drawing Sheets

(51) Int. Cl.

| | | |
|---|---|---|
| *G06F 3/0481* | (2013.01) | |
| *G06F 3/01* | (2006.01) | |
| *A63F 13/213* | (2014.01) | |
| *A63F 13/426* | (2014.01) | |
| *G06F 3/03* | (2006.01) | |
| *G06F 3/042* | (2006.01) | |
| *G06F 3/0484* | (2013.01) | |

(52) U.S. Cl.
CPC ............ *A63F 13/573* (2014.09); *G06F 3/017* (2013.01); *G06F 3/04812* (2013.01); *G06F 3/011* (2013.01); *G06F 3/0325* (2013.01); *G06F 3/0425* (2013.01); *G06F 3/04845* (2013.01)

(56) References Cited

U.S. PATENT DOCUMENTS

| | | | | |
|---|---|---|---|---|
| 2012/0113140 A1* | 5/2012 | Hilliges | ............... | G06F 3/011 345/633 |
| 2012/0117514 A1* | 5/2012 | Kim | ............... | G06F 3/011 715/849 |
| 2013/0286004 A1* | 10/2013 | McCulloch | ............... | G06T 19/006 345/419 |
| 2013/0328762 A1* | 12/2013 | McCulloch | ............... | G02B 27/017 345/156 |
| 2014/0002493 A1* | 1/2014 | Mitchell | ............... | G06T 13/20 345/633 |
| 2014/0071069 A1* | 3/2014 | Anderson | ............... | A63F 13/06 345/173 |
| 2014/0071241 A1* | 3/2014 | Yang | ............... | G06T 19/006 348/46 |
| 2014/0104274 A1* | 4/2014 | Hilliges | ............... | G06F 3/011 345/424 |
| 2014/0306891 A1* | 10/2014 | Latta | ............... | G06F 3/017 345/158 |
| 2015/0185826 A1* | 7/2015 | Mullins | ............... | G06T 19/006 345/633 |

FOREIGN PATENT DOCUMENTS

| | | |
|---|---|---|
| CN | 104407696 A | 3/2015 |
| WO | 2014168901 A1 | 10/2014 |

* cited by examiner

METHOD FOR SIMULATING AND CONTROLLING VIRTUAL SPHERE IN A MOBILE DEVICE

CROSS-REFERENCE TO RELATED APPLICATIONS

This application is a national stage filing under 35 U.S.C. 371 of International Application No. PCT/CN2015/093735 filed Nov. 3, 2015, which claims the foreign priority benefit of Chinese Patent Application No. 201410619473.X filed Nov. 6, 2014, which are incorporated by reference herein in their entireties.

TECHNICAL FIELD

The present invention relates to an augmented reality system, and in particular, to a method for simulating and controlling virtual sphere in a mobile device.

BACKGROUND ART

With the development of mobile devices and technology, the design and development of an augmented reality system on mobile devices are of great significance on the promotion and development of the augmented reality technique. The augmented reality technique is able to enhance the immersive feeling of a user by combing virtual information with a realistic scene. The action commands of the user can be captured by a sensor or a camera screen.

Conventional computer-based human-machine interaction systems normally rely on devices like mouse and keyboard. However, in case that an augmented reality system is implemented on a mobile device, interaction through keyboard is subject to jitters, which leads to significant influences on the precision of interaction. In real life, people can flexibly manipulate a real object such as a sphere object using hands through their senses of sight, touch and force, and people's hands have become a most direct, natural and realistic medium for communicating with a third-party world.

However, interactions between a person and a sphere object in the prior art are basically divided into two types: (1) interaction between a person and a real sphere; (2) interaction between a person and a virtual sphere realized by capturing position of the person using a special physical detecting device such as an infrared detector.

Therefore, there is a demand for a virtual sphere simulation and control device which readily realizes the interaction between a user and a virtual sphere without an additional device.

SUMMARY

According to one embodiment, the present invention provides a method for simulating and controlling virtual sphere in a mobile device, comprising: acquiring images using an image acquisition component of the mobile device, so as to acquire a sequence of continuous images; analyzing contents of the images; in the sequence of the acquired images, according to a certain rule, carrying out the interaction between a virtual sphere and the contents of the images as well as a user; and displaying a result of interaction on a screen of the mobile device.

Preferably, analyzing contents of the images comprises: calculating image edges in the vicinity of the virtual sphere; calculating velocity and direction of a collision; updating a position of the virtual sphere; and displaying the virtual sphere.

Preferably, rules for the interaction comprise at least one of the following: rigid collision between a sphere and color borders in the image is occurred; rigid collision between the sphere and the left, right and lower edges of the screen is occurred; in the screen, the sphere suffers from virtual gravity field, and thereby "falls" toward the lower part of the screen, the virtual gravity field being from the upper part of the screen to the lower part of the screen; rigid collision between the sphere and a user's finger is occurred, angle and strength of the collision between the sphere and the finger is considered when the collision occurs; the sphere flies out of the screen upwardly, and falls in free ball merely toward the lower part of the screen after flying out of the screen; only collision between the lower part of the sphere and the image contents as well as the user's finger is taken into consideration.

Preferably, calculating image edges in the vicinity of the virtual sphere comprises: converting the input image into a grayscale image; calculating a grayscale histogram of the lower part of the virtual sphere; generating a grayscale probability plot using the histogram; and taking the generated probability plot as a basis for the judgment of the edges.

Preferably, an image edge is a junction of regions having different grayscale probabilities.

Preferably, the velocities of the collision in the transverse and longitudinal directions are independent from each other, the velocity in the transverse direction is proportional to the distance from a contact point in the transverse direction to the virtual sphere center, and the velocity in the longitudinal direction is inversely proportional to the distance from a contact point in the longitudinal direction to the sphere center.

According to the disclosure and the following detailed descriptions on the drawings, other purposes, features and advantages will be obvious to those skilled in the art.

BRIEF DESCRIPTION OF DRAWINGS

The drawings illustrate embodiments of the present invention, and are used along with the Description to explain principles of the present invention. In the drawings.

DETAILED DESCRIPTION

Embodiments according to the present invention disclose a virtual sphere simulation and control method of a mobile device. For illustrative purposes, multiple specific details are stated in the following descriptions so as to provide a comprehensive understanding of embodiments of the present invention. However, it is obvious to those skilled in the art that embodiments of the present invention can be implemented without such specific details.

In the present invention, ordinary images are captured by using a common consumer-level image acquisition device (such as a cell phone, a tablet computer, and a household camera), and an effect of the interaction between a person and a virtual sphere is achieved by using a result of intelligently analyzing the images. Specifically, the present invention discloses a system which acquires image information by using an image acquisition device (such as a camera), generates a virtual sphere by using a computing device (such as a PC, a cell phone, and a tablet computer, etc), intelligently analyzing the acquired image contents by using an image processing method, interacting with the virtual sphere on the basis of the analysis, and finally displaying the result of the interaction and the image on a display device (such as a cell phone, a display, etc).

Figure 1:
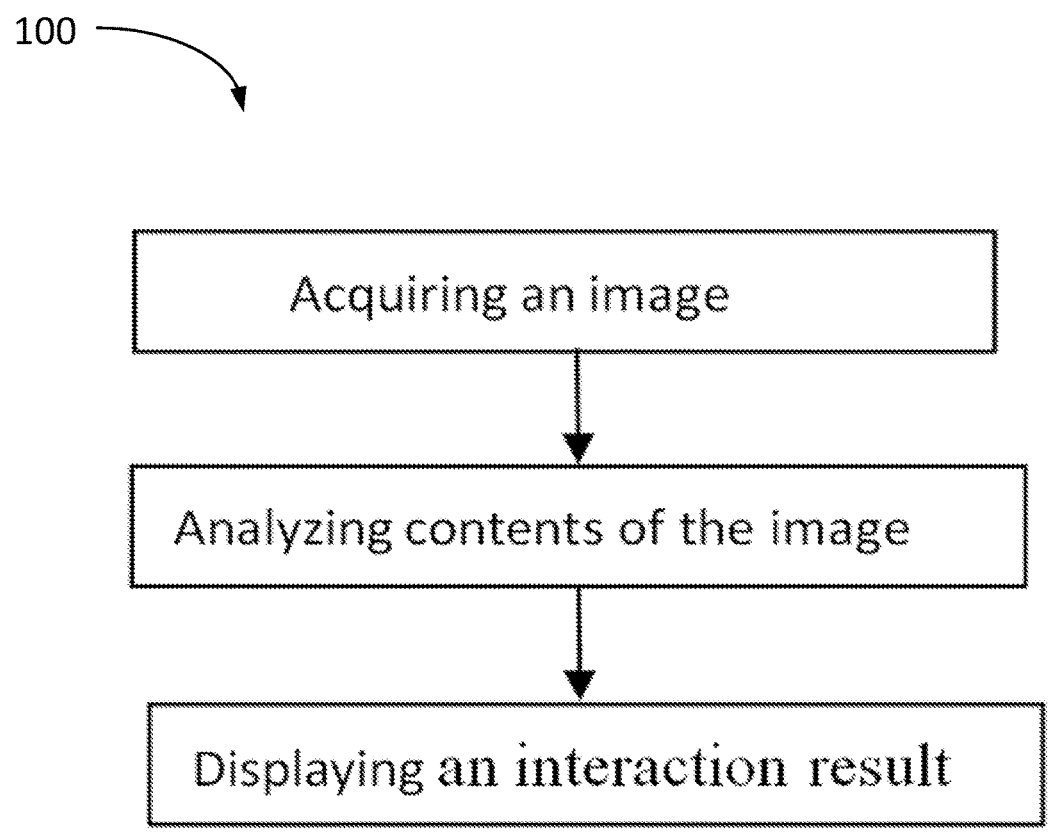
FIG. 1 illustrates a virtual sphere simulation and control method according to the embodiment of the present invention.

FIG. 1 illustrates a virtual sphere simulation and control method 100 according to the embodiment of the present invention. The method 100 mainly comprises three steps: acquiring images, analyzing contents of the images, and displaying interaction a result.

Specifically, in the course of acquiring images, a sequence of continuous images is acquired by using a common image acquisition device (such as a cell phone and a desktop PC camera). The image acquisition device is movable, which has no influence on the result of interactions with the virtual sphere.

In the course of analyzing contents of images, the present invention assumes that the virtual sphere interacts with the image contents and the user in the sequence of acquired images according to a certain rule. In the following, virtual juggling ball will be described by way of example. Note that the virtual juggling ball is merely, without limiting the present invention in terms of embodiments, used for explaining how a virtual sphere interacts with the image contents and the user, and thereby any application including interactions between a virtual sphere and an image as well as a user falls within the scope of the present invention.

Figure 2:
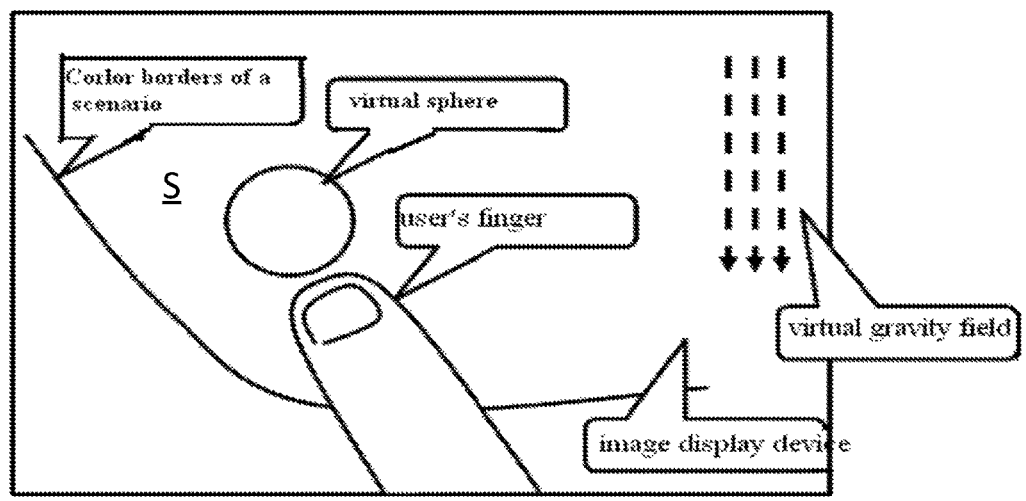
FIG. 2 is a schematic diagram illustrating a scenario for applying the embodiment of the present invention.

FIG. 2 is a schematic diagram illustrating a scenario for applying the embodiment of the present invention. As shown in FIG. 2, a user holds device (such as a cell phone) with his/her hands, aims camera of the phone at a certain scenario S and orients the display screen to the user. Then the user places his/her finger into the scenario S to which the image acquisition device (such as a cell phone camera) is oriented, in order to interact with the virtual juggling ball. Rules for interaction are as follows:

(1) rigid collision between a sphere and the color borders in the image is occurred;

(2) rigid collision between the sphere and the left, right and lower edges of the screen is occurred;

(3) in the screen, the sphere suffers from virtual gravity field from the upper part of the screen to the lower part of the screen, and thereby "falls" toward the lower part of the screen;

(4) rigid collision between the sphere and the user's finger is occurred, angle and strength of the collision between the sphere and the finger should be considered when the collision occurred;

(5) the sphere flies out of the screen upwardly, and falls in free ball merely toward the lower part of the screen after flying out of the screen;

(6) only collision between the lower part of the sphere and the image contents as well as the user's finger is taken into consideration, and collision of the upper part of the sphere is not considered;

(7) "sphere" is merely orally used to refer to a virtual sphere, and it is in fact displayed as a perfect circle on the screen.

Those skilled in the art will understand that any interaction device satisfying the functions and any interaction manner based on image processing are included in the interaction manner of the present invention. For example, the virtual sphere used in the present invention is not limited to a virtual juggling ball, and it may be a virtual ice-curling ball, a virtual ping-pong, a virtual basketball, etc.

Figure 3:
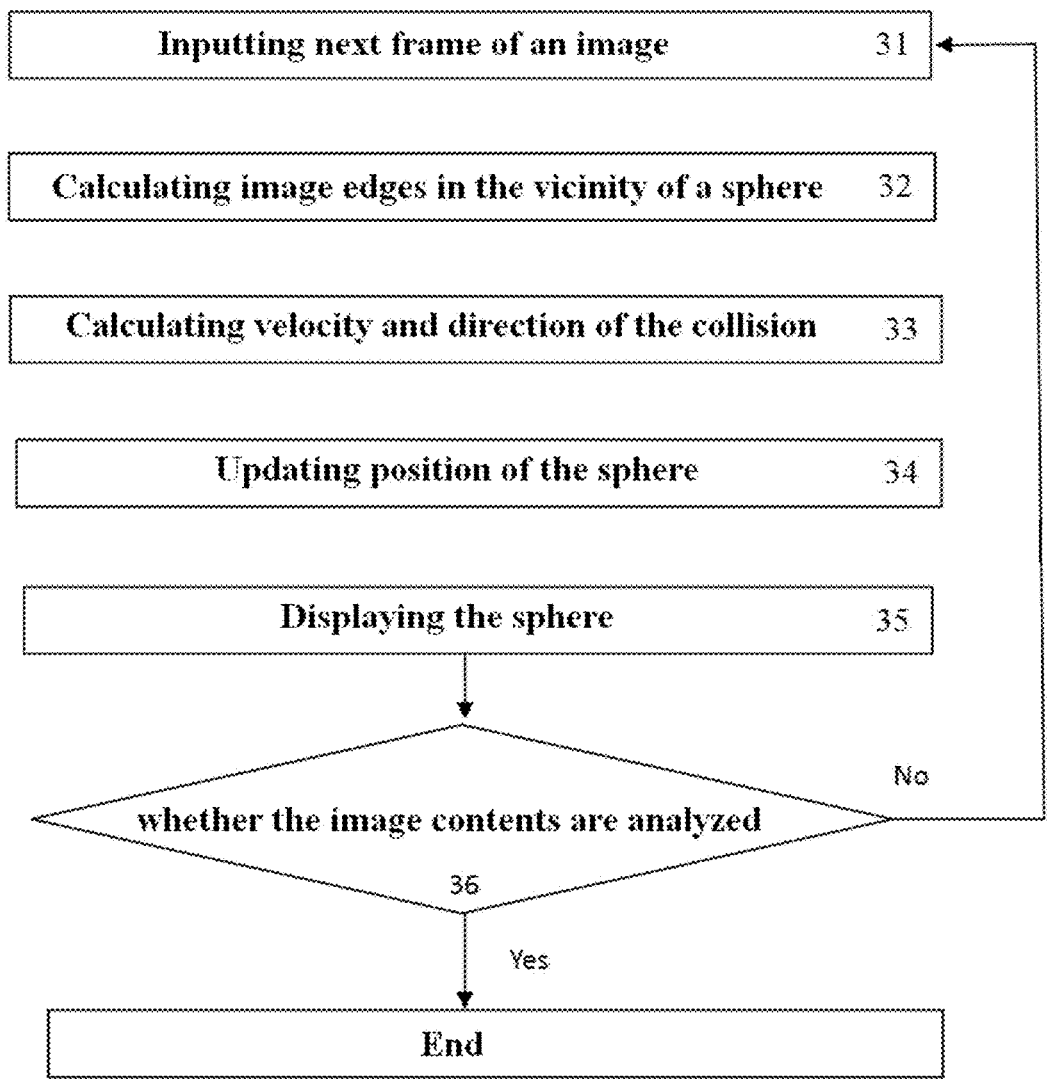
FIG. 3 is a flow chart illustrating how to implement the step of analyzing contents of the image in FIG. 1.

FIG. 3 is a flow chart illustrating how to implement the step of analyzing contents of the image in FIG. 1. In step 31, next frame of an image is input. In step 32, the image edges in the vicinity of a sphere are calculated. In step 33, velocity and direction of the collision is calculated. In step 34, position of the sphere is update. In step 35, the sphere is displayed. In step 36, determination on whether the image contents are analyzed is performed. If so, the process is terminated. If not, the process returns to step 31.

Calculating the Image Edges in the Vicinity of a Sphere

Figure 4:
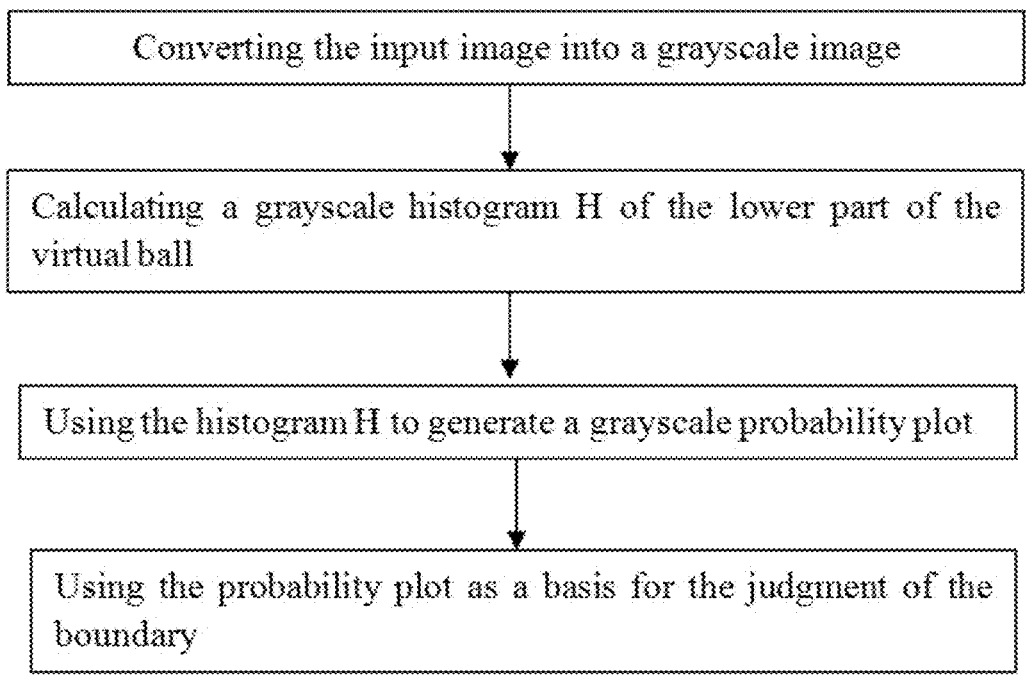
FIG. 4 is a flow chart illustrating how to calculate the image edges in the vicinity of a sphere.

FIG. 4 is a flow chart illustrating how to calculate the image edges in the vicinity of a sphere. The principle for calculating the image edges in the vicinity of a sphere is as follows: in the present application, color of the lower part of a sphere is considered as one color. When there are two or more grayscales, it is regarded that some objects enter into the scope of the sphere to interact with the sphere. The specific calculation process involves calculation of a histogram and generation of a probability plot.

As shown in FIG. 4, firstly, the input image is converted into a grayscale image. Then, histogram H showing grayscales of the lower part of the sphere is calculated. Then the histogram H showing grayscales is used to generate a probability plot showing grayscales. Lastly, judgment of the edges is performed according to the generated probability plot.

A. Calculating a Histogram

Figure 5:
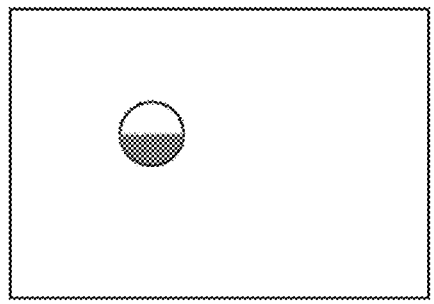
FIG. 5 is a grayscale image when no other object enters the scope of the sphere.

FIG. 5 is a grayscale image when no other object enters the scope of the sphere. In the image, the gray region is a scope on which the color histogram is calculated. Method for calculating the color histogram:

$$H(i) = \sum_{j=0}^{N} P(j)$$

$$\text{wherein } p(j) = \begin{cases} 1, & \text{if the grayscale} = i \\ 0, & \text{if the grayscale} \neq i \end{cases}$$

H is an array consisting of 256 elements, each element represents the number of pixels which grayscale value equals to i in the grayscale image. Gray region range on the grayscale image is traversed for each pixel P(j), j represents the j-th pixel, and N is the total number of the pixels in the grayscale region. If the grayscale value P(j)=i, H(i)=H(i)+1.

B. Generating a Probability Plot

Figure 6:
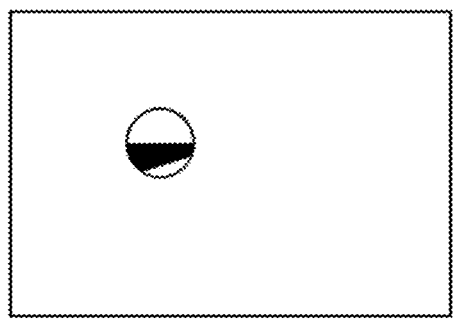
FIG. 6 is a grayscale image when another object enters the scope of the sphere.

FIG. 6 is a grayscale image when another object enters the scope of the sphere. As stated above, after H is calculated, the present invention regards that the grayscales mostly appeared are regarded as the main background grayscale, and pixels of other grayscales represent an interactive object which enters into the scope of the sphere body.

The probability of appearing is:

$$D(j) = 255 \times \left(1 - \frac{H(\text{grayscale}(j))}{H_{Max}}\right)$$

D(j) represents the grayscale value of each pixel of a small probability plot, j represents the j-th pixel, $H_{Max}$ represents a maximum value in the 256 elements of the histogram. In the image D derived, the larger the grayscale value is, the fewer the colors in the scope of the sphere body are, i.e., the greater the probability is that the pixels are an interaction object entering the sphere. Then, the image edges present as a junction of two regions having different appearing probabilities, i.e., a junction of regions having different grayscale probabilities.

Calculating the Velocity and Direction of Collisions

According to the present invention, in the appearing probability plot D generated in the previous step, the gravity center of the region having a greater probability that the pixels are an interaction object is an interaction point $P_{Int}$ of the interaction object and the sphere, and the difference of the $P_{Int}$ relative to the sphere center between the horizontal and vertical coordinates (pixels) represents the strength in the interactive horizontal and vertical directions, the velocities in the horizontal and vertical directions are independent from each other.

Method for calculating the interaction point is:

$$P_{Int}(X_C, Y_C)$$

$$X_C = \frac{1}{M}\sum_{j=1}^{N}(D(j) \times X_i)$$

$$Y_C = \frac{1}{M}\sum_{j=1}^{N}(D(j)Y_j)$$

X and Y represent the horizontal coordinate and vertical coordinate of the region having a greater probability, D(j) is the probability calculated in the previous step, $X_C$ and $Y_C$ are the coordinates of the gravity center. The transverse velocity is proportional to the distance from the contact point in the X direction to the sphere center, the longer the distance from the contact point to the sphere center is, the faster the contact velocity is. The longitudinal velocity is inversely proportional to the distance from the contact point in the Y direction to the sphere center, the shorter the distance from the contact point to the sphere center is, the faster the contact velocity is.

$$V_X = \frac{|X_C - X_0|}{R} \times V_{X,Max}$$

$$V_Y = \left(1 - \frac{|Y_C - Y_0|}{R}\right) \times V_{Y,Max}$$

The subscript Max represents the maximum velocities in the transverse direction and the longitudinal direction which are predetermined fixed values.

Updating the Position of the Sphere

According to present invention, the position of the sphere is independently moved in the transverse direction and the longitudinal direction staring from an initial static condition. In the transverse direction, the sphere moves uniformly in a straight line at a collision velocity $V_X$ after each occurrence of interaction (by touching the hand, the image edges, and the boundaries of the screen). In the longitudinal direction, the sphere is thrown upward vertically with an initial velocity of collision velocity $V_Y$ after the occurrence of the interaction in the longitudinal direction (see: http://baike.baidu.com/link?url=tJ8e6IfmpCZqSxfLM98X7_qCWeu-q2JQBHDCRJfb8GxDqZHhCqxeHuJ_9GokBCSzZ)

The current position of the sphere is:

$$X = X_t + V_X \times T$$

$$Y = Y_t + (V_Y - 0.5 \times g \times T) \times T$$

wherein the subscript t represents the t-th collision $X_t$, and $Y_t$ represents the horizontal and the vertical coordinates of the t-th collision, g is the gravity acceleration, and T represents a time interval between the current time and the time when the t-th collision occurs.

Displaying the Sphere

The virtual sphere is displayed on the screen at the current position X, Y. Then all the operations are completed.

In the present invention, ordinary images are captured by using a common consumer-level image acquisition device (such as a cell phone, a tablet computer, and a household camera), and an effect of the interaction between a person and a virtual sphere is achieved by using a result of intelligently analyzing the images, such that a result of the human-sphere interaction is displayed to the user using the image processing-based augmented reality method. Therefore, the present invention can allow an ordinary user to interact with a virtual sphere generated by the augmented reality technique, using a common image acquisition device and a display device such as a cell phone and a tablet computer, such that the user has a more immersive feeling of real scenes and betters snaps into the augmented reality system, thereby realizing a unique interaction manner that cannot be implement in the prior art.

The above embodiment is merely a preferred embodiment of the present invention, and is not used to limit the present invention. It is obvious to those skilled in the art that various amendments and modifications can be made to the embodiment of the present invention without digressing from the sprit and scope of the present invention. Thus, the present invention aims to cover all amendments or transformations which fall within the scope of the present invention defined in the claims.

The invention claimed is:

1. A method for simulating and controlling a virtual sphere in a mobile device, comprising:
   acquiring images using an image acquisition component of the mobile device, so as to acquire a sequence of continuous images;
   carrying out an interaction between the virtual sphere, contents of the images, and a user according to a certain rule to update a position of the virtual sphere in the images; and
   displaying the virtual sphere, as updated, on a screen of the mobile device in the images,
   wherein carrying out the interaction between the virtual sphere, the content of the images, and the user according to the certain rule to update the position of the virtual sphere includes
      calculating image edges in a vicinity of the virtual sphere, and
      calculating a velocity and a direction of a collision,
      wherein calculating image edges in the vicinity of the virtual sphere includes
         converting an input image included in the images into a grayscale image,
         calculating a grayscale histogram of a lower part of the virtual sphere,
         generating a grayscale probability plot using the histogram, and taking the generated grayscale probability plot as a basis for a judgment of
the image edges in the vicinity of the virtual sphere.

2. The method according to claim 1, wherein the certain rule defines behavior of the virtual sphere based on the interaction between the virtual sphere, the contents of the images, and the user, the certain rule comprising at least one of the following:

a rigid collision occurs when the virtual sphere and color borders of one of the images interact;

a rigid collision occurs when the virtual sphere and at least one a left edge, a right edge, and a lower edge of the screen interact;

the virtual sphere falls toward a lower part of the screen due to a virtual gravity field, the virtual gravity field being from an upper part of the screen to the lower part of the screen;

a rigid collision occurs when the virtual sphere and the user's finger interact, wherein an angle and a strength of the rigid collision between the virtual sphere and the user's finger is considered when the collision occurs;

the virtual sphere flies out of the screen upwardly and the virtual sphere falls in free ball toward the lower part of the screen after flying out of the screen;

only a collision between the lower part of the virtual sphere and the contents of the images or a collision between the virtual sphere and the user's finger is taken into consideration.

3. The method according to claim 1, wherein at least one of the image edges is a junction of regions having different grayscale probabilities.

4. The method according to claim 1, wherein calculating the velocity of the collision includes calculating a velocity of the collision in a transverse direction and calculating a velocity of the collision in a longitudinal direction, wherein velocities of the collision in the transverse and longitudinal directions are independent from each other, the velocity in the transverse direction is proportional to a distance from a contact point of the collision in the transverse direction to a center of the virtual sphere, and the velocity in the longitudinal direction is inversely proportional to a distance from the contact point of the collision in the longitudinal direction to the center of the virtual sphere.

* * * * *